(12) United States Patent
Grosskrueger et al.

(10) Patent No.: US 6,776,258 B1
(45) Date of Patent: Aug. 17, 2004

(54) ACOUSTIC BLANKET SYSTEM

(75) Inventors: Duane D. Grosskrueger, Highlands Ranch, CO (US); Brett E. Pisor, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/036,238

(22) Filed: Dec. 28, 2001

(51) Int. Cl.⁷ .............................................. E04B 1/343
(52) U.S. Cl. ...................... 181/294; 181/290; 181/284
(58) Field of Search .................. 181/284–294, 181/296, 205; E04B 1/343, 1/82, 1/84

(56) References Cited

U.S. PATENT DOCUMENTS

| | | | | |
|---|---|---|---|---|
| 3,221,835 A | * | 12/1965 | Wegner | 181/287 |
| 4,456,092 A | * | 6/1984 | Kubozuka et al. | 181/290 |
| 4,848,514 A | | 7/1989 | Snyder | 181/290 |
| 4,940,112 A | * | 7/1990 | O'Neill | 181/290 |
| 5,039,567 A | * | 8/1991 | Landi et al. | 428/116 |
| 5,175,401 A | | 12/1992 | Arcas et al. | 181/292 |
| 5,300,178 A | * | 4/1994 | Nelson et al. | 156/292 |
| 5,445,861 A | | 8/1995 | Newton et al. | 428/116 |
| 5,557,078 A | * | 9/1996 | Holwerda | 181/208 |
| 5,670,758 A | | 9/1997 | Borchers et al. | 181/286 |
| 5,691,037 A | * | 11/1997 | McCutcheon et al. | 428/172 |
| 5,700,527 A | * | 12/1997 | Fuchs et al. | 428/34.4 |
| 5,824,974 A | * | 10/1998 | Campbell | 181/290 |
| 6,007,026 A | | 12/1999 | Shorey | 244/158 A |
| 6,213,430 B1 | | 4/2001 | Spandorf | 244/158 R |
| 6,224,020 B1 | | 5/2001 | Hopkins et al. | 244/158 R |
| 6,231,710 B1 | | 5/2001 | Herup et al. | 156/173 |
| 6,260,660 B1 | | 7/2001 | Yoerkie, Jr. et al. | 181/290 |

* cited by examiner

*Primary Examiner*—Marlon T. Fletcher
*Assistant Examiner*—David Warren
(74) *Attorney, Agent, or Firm*—Marsh Fischmann & Breyfogle LLP

(57) ABSTRACT

An acoustic blanket system for use in attenuating acoustic energy. The acoustic blanket system including an acoustic blanket and apparatus for mounting the acoustic blanket to a structure. The acoustic blanket includes first and second cover materials heat-sealed around at least a portion of their perimeter. At least one acoustic attenuating panel is disposed within the heat-sealed cover materials to form a fully encapsulated acoustic blanket. The system for mounting the blanket includes a plurality of fastener assemblies that connect the blanket to a structure to define a tunable air gap of pre-determined dimension between the blanket and the structure. The mounting system also provides dimensional control of the blanket relative to the structure to control the air gap and prevent slumping and/or deformation during maximum loading environments.

34 Claims, 7 Drawing Sheets

ACOUSTIC BLANKET SYSTEM

FIELD OF THE INVENTION

The invention is related to the field of acoustic blankets, and in particular to an acoustic blanket and attachment system referred to herein together as an acoustic blanket system.

BACKGROUND OF THE INVENTION

Rocket powered space vehicles generally include a launch vehicle portion and payload portion. The launch vehicle portion provides the primary thrust for launching and delivering the payload portion from the earth's surface into a desired orbit. Acoustic blankets are used on space vehicles to protect the payload and other systems from damage caused by acoustic energy generated by the rocket engines and dynamic pressure. These blankets are passive systems that include an acoustic absorbing material, such as honeycomb or fiberglass batting, disposed within a cover material such as carbon Teflon impregnated fiber glass or an aluminized broad good. The cover material is folded, sewn, and/or taped in various elaborate manners around the acoustic absorbing material to form a blanket of predetermined dimension. The blanket is mounted to the space vehicle, such as on a payload fairing, in a side-by-side relationship with other similar blankets. Separate metallic frames, adhesive, or lacing tape is typically used to attach the blankets to the space vehicle.

Unfortunately, present acoustic blankets suffer from numerous drawbacks primarily related to the manner in which the blankets are constructed and the materials used, thus resulting in heavy, costly, and complicated blanket designs. For example, a typical blanket costs on the order of eight hundred to one thousand dollars to manufacture and can weigh as much as eight to nine pounds per square foot.

Yet another problem with present acoustic blanket designs is that they are often ineffective at lower frequency levels, e.g. below 500 Hz. One solution to this problem is provided by the incorporation of a Helmholtz resonator within the blanket. These resonators, however, add additional costs to the blanket construction and are limited by their sandwich core concept that is susceptible to weaknesses such as delamination of the core/face sheet and moisture retention.

Another problem with present acoustic blanket designs is related to the inadequacy of certain present attachment methods, e.g. adhesives, lacing tapes and complex metallic frames. During flight, it is common for some or all of the blankets to become detached from the launch vehicle and slump, creating a gap between adjacent blankets that permits the transmission of un-dampened acoustic vibrations through the fairing. In addition, because acoustic energy responds differently when transferred through different mediums, it Is often desirable to leave an air gap between the acoustic blanket and the launch vehicle skin. In this case, the frame method of attachment is used to affix the blanket(s) and maintain the air gap. The frame, however, results in additional weight as well as other problems such as dimensional control of the air gap.

SUMMARY OF THE INVENTION

The present invention generally relates to an acoustic blanket system and methods for use and manufacturing the same. The present acoustic blanket system and methods are primarily for use with space vehicles, but as will be apparent from the following description, are appropriate for use in other applications requiring attenuation of acoustic energy. Accordingly, it is an object of the present invention to provide a lightweight, low cost, robust acoustic blanket and installation system. Another object of the present invention is to provide an acoustic blanket that is easily fabricated, requires no complicated folding or forming, and minimizes nonrecurring tooling and templates. Another object of the present invention is lo provide an acoustic blanket that is mountable to a surface so as to define an air gap between the blanket and the surface that is tunable to achieve improved acoustic attenuation efficiency. Finally, another object of the present invention is to provide a blanket that is not subject to slumping and repositioning problems during ascent and maximum loading environments.

These objects and other advantages are provided by the present acoustic blanket system, which includes an improved acoustic blanket design and system for connecting the acoustic blanket to a structure, such as a space vehicle fairing. The acoustic blanket may include first and second carbon Teflon impregnated fiberglass cover materials and at least one Polyimide foam panel. The Polyimide foam panel (s) is disposed between the cover materials, which are heat-sealed around at least a portion of their perimeter to form a low mass fully encapsulated blanket.

Various refinements exist of the features noted in relation to the present acoustic blanket. Further features may also be incorporated into the acoustic blanket to form multiple examples of the present invention. These refinements and additional features will be apparent from the following description and may exist individually or in any combination. For instance, the acoustic blanket may be combined with the system for connecting the acoustic blanket to a structure. The system may include a plurality of fastener assemblies that connect the blanket to a structure to define an air gap of pre-determined dimension between the blanket and the structure. The fastener assemblies may include standoffs of varying dimension that are used to achieve precise air gap dimensions. The fastener assemblies also include a mating threaded member to connect the blanket to the standoffs. Grommets installed in the heat-sealed perimeter of the cover materials may also be used to provide reinforcement at the attachment points between the blanket and standoffs. In this regard, the mounting assembly provides dimensional control of the blanket relative to the structure to control the air gap and prevent slumping and/or deformation during maximum loading environments.

The acoustic blanket may also include at least one vent heat-sealed into one of the cover materials for pressure equalization within the blanket. The vent is preferably a relatively fine mesh to prevent particulates from the Polyimide foam core panel from escaping from the blanket and contaminating the surrounding environment.

The acoustic blanket may also include at least one barrier ply layer disposed within the cover materials. The barrier ply may be heat-sealed or mechanically attached along its perimeter to the cover materials. The barrier ply layer is preferably a septum material that exhibits efficient acoustic attenuating properties in the frequency range below 500 Hz. In examples of the present blanket where multiple Polyimide foam panels are included, various tuning options to achieve different acoustic attenuation characteristics for the blanket are provided by varying the thickness of the panels and the position of the barrier ply layer-within the blanket. Since the barrier ply layer does not permit significant acoustic energy transmission between sections of the blanket separated by the barrier ply layer, the barrier ply layer effectively defines an air gap between the barrier ply layer and the skin of the launch vehicle. When multiple panels are utilized, the air gap is easily increased and/or decreased by the location of the barrier ply within the blanket, and specifically between different ones of the multiple panels to achieve different acoustic attenuation characteristics.

DETAILED DESCRIPTION

Reference will now be made to the accompanying drawings, which at least assist in illustrating the various pertinent features of the present invention. For purposes of illustration, the following description depicts a rectangular acoustic blanket having nominal dimensions of about eighteen by thirty-six inches and a nominal thickness of about three inches. It will be appreciated, however, that acoustic blankets of various dimensions could be constructed according to the principles of the present invention, as the blanket dimensions are largely a function of the application and desired acoustic attenuation properties. In addition, the following description is primarily directed toward acoustic blankets for use on space vehicles, although the present acoustic blanket system could be utilized in numerous other environments that require acoustic attenuation.

Figure 1:
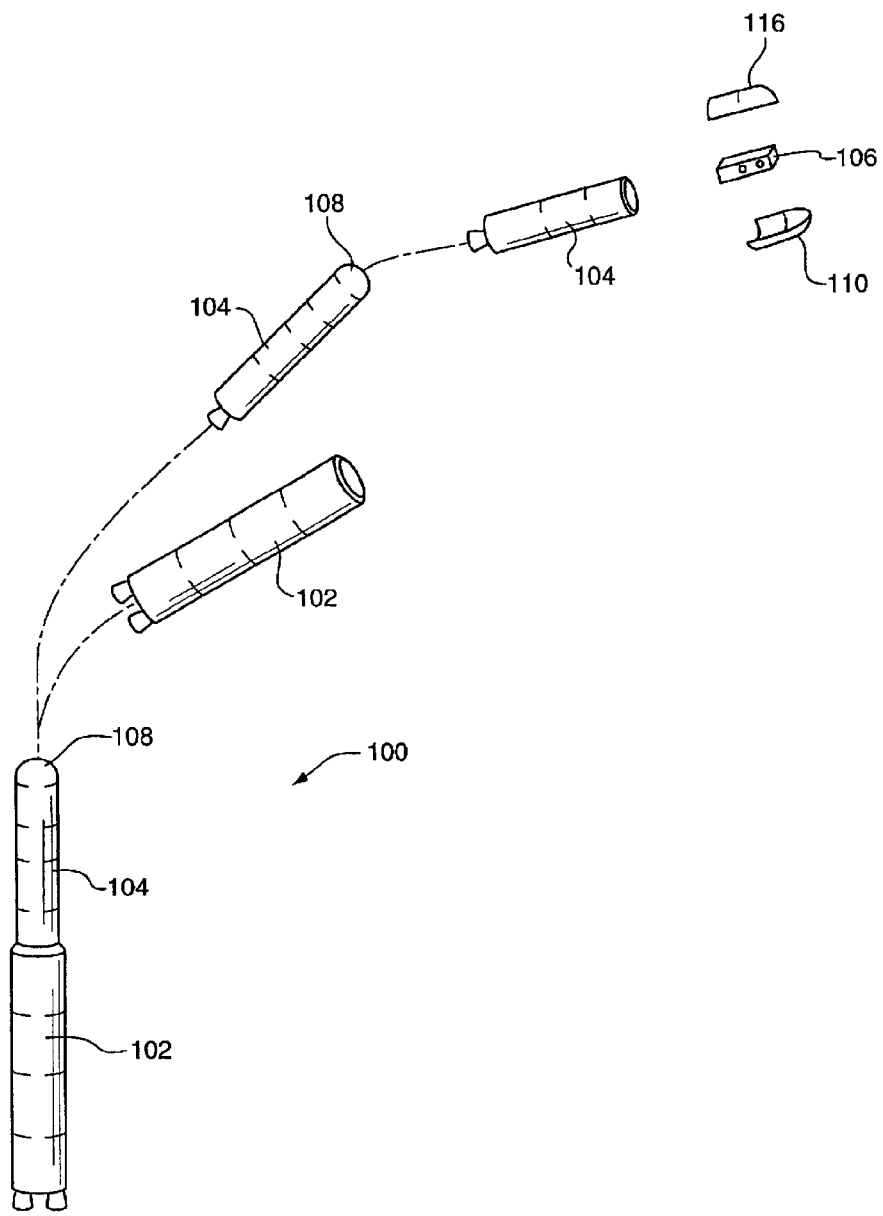
FIG. 1 illustrates an example of a space vehicle that Is configured with the present acoustic blanket system.

FIG. 1 illustrates an example of a space vehicle 100 that includes at least one acoustic blanket system according to the present invention. The space vehicle 100 typically includes a first rocket stage 102 and a second rocket stage 104. The second rocket stage 104 includes a payload 106 housed in a payload fairing assembly 108. The payload fairing assembly 108 includes fairings structures, 110 and 116, which protect the payload 106 during the launch and flight into a desired orbit or separation altitude.

By way of background, acoustic blankets are utilized on space vehicles, such as vehicle 100 to attenuate acoustic noise or vibration generated during the launch and flight of the vehicle into orbit. These blankets are typically utilized on the interior of fairing structures, such as structures, 110 and 116, to protect the payload 106. To achieve a proper fit, multiple blankets of pre-determined dimensions are utilized. The individual blankets are mounted in a side-by-side relationship to form a continuous barrier of protection over the assembled fairing assembly, such as fairing assembly 108. The mounting of the multiple blankets, however, often poses significant difficulty, as it is important that gaps do not exist between the blankets where un-damped acoustic energy can be transmitted. In addition, blanket mounting is further complicated in many applications, because an even higher blanket performance can be achieved by leaving an air gap between the surface of the fairing structure and the acoustic blanket mounted thereto. In this case, the individual blankets must be mounted to provide the desired air gap between the fairing structure and the blankets, while eliminating air gaps between the individual blankets themselves. Finally, because of their environment of use, it is highly desirable that the blankets be constructed using low mass materials to produce an effective but lightweight blanket.

The acoustic blanket system according to the present invention, improves over prior art blanket designs by addressing the above issues to yield an inexpensive, highly effective, easily manufactured, low mass acoustic blanket, that is easily mounted to a structure, such as the fairing structures 110 and 116.

The Acoustic Blanket

Figure 2:
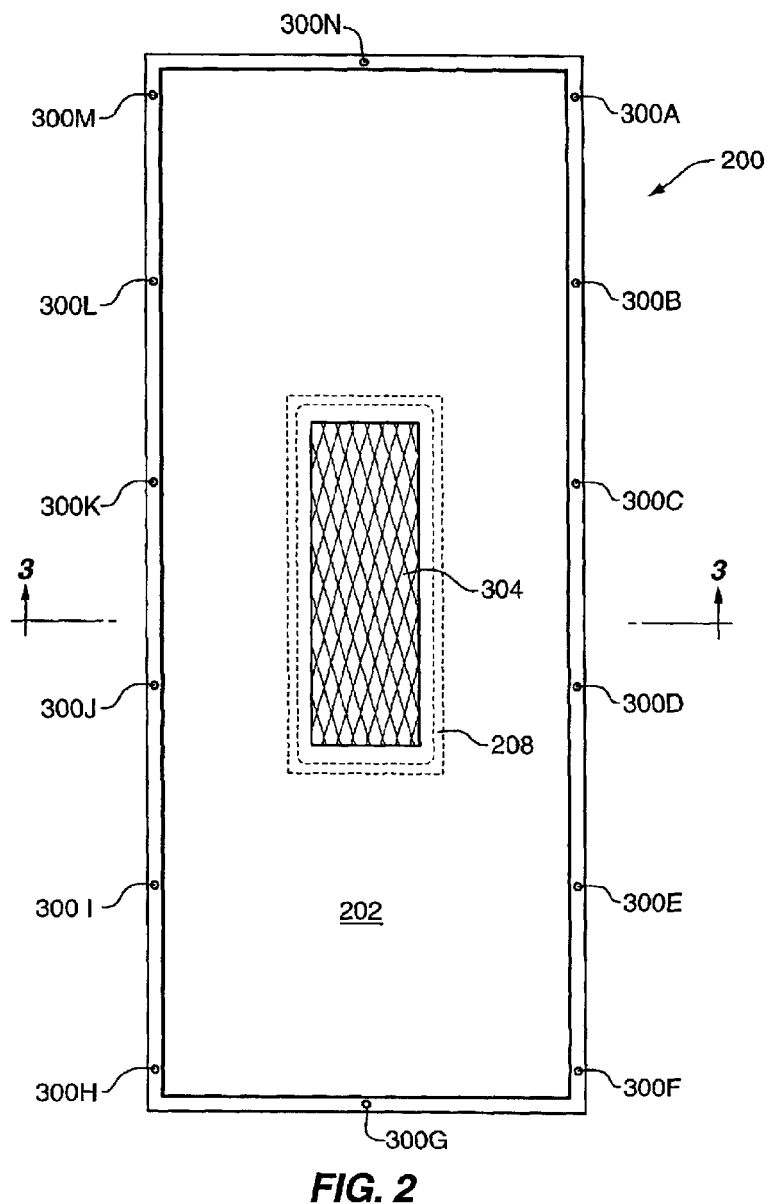
FIG. 2 illustrates a plan view of a first embodiment of an acoustic blanket according to the present invention.
Figure 3:
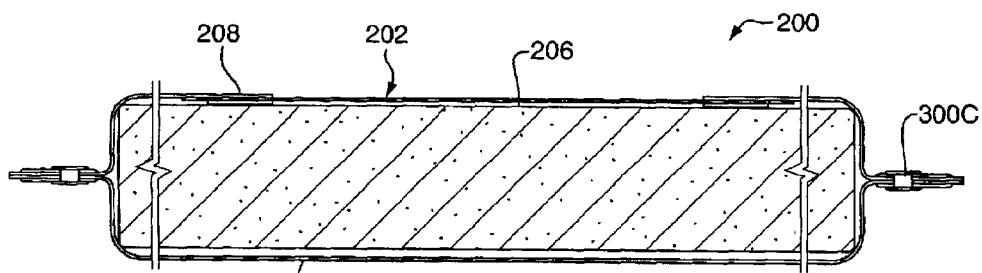
FIG. 3 illustrates a cross sectional view of the acoustic blanket of FIG. 2.
Figure 4A:
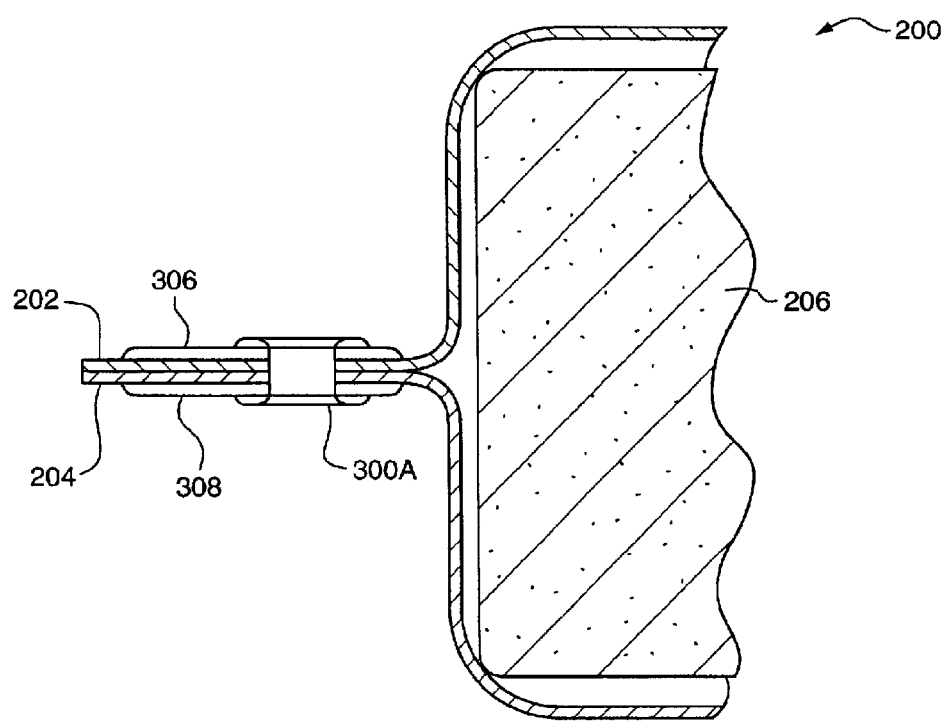
FIG. 4a illustrates a partial cross sectional view of the perimeter of the acoustic blanket of FIG. 2.
Figure 4B:
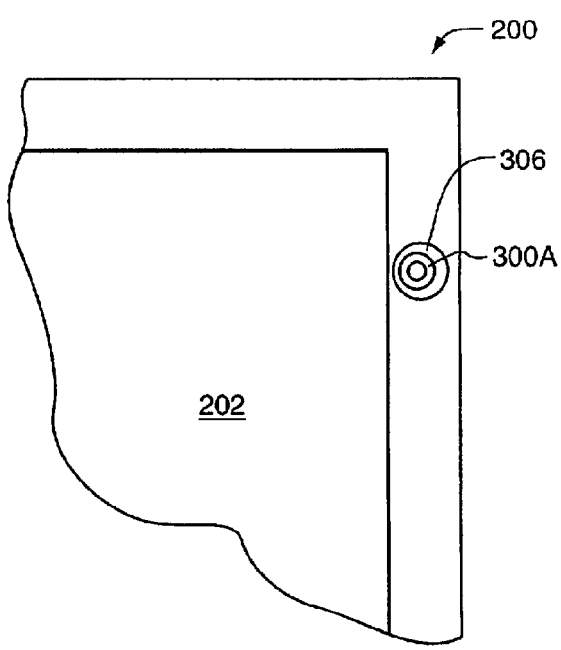
FIG. 4b illustrates a partial plan view of the perimeter of the acoustic blanket of FIG. 2.

FIGS. 2–4 illustrate one embodiment of an acoustic blanket, namely blanket 200. The blanket 200 includes at least one acoustic attenuating panel 206 disposed between top and bottom cover materials, 202 and 204, respectively. Alternatively, however, multiple acoustic attenuating panels, such as panel 206, could be included as a matter of design choice and desired acoustic attenuation performance. Additionally, the thickness of the one or more acoustic attenuating panels, e.g. 206, may vary as a matter of design choice and desired acoustic attenuation performance.

The panel 206 is preferably a Polyimide foam panel cut to pre-determined dimensions, such as the nominal dimensions of eighteen inches wide by thirty-six inches long by three inches thick. The use of at least one Polyimide foam panel 206 provides the specific advantage of being an inexpensive but efficient acoustic absorbing material. Additionally, the Polyimide foam panel 206 provides the advantages of being extremely lightweight (8 kg/m$^3$), flexible, resilient over a wide temperature range, a good thermal insulator, and environmentally friendly requiring no protective clothing or respiratory masks during manufacturing of the blanket 200.

The top and bottom cover materials, 202 and 204, are preferably carbon Teflon impregnated fiberglass having a thickness in the range of 0.001 to 0.005 inches and more preferably 0.003 inches. The use of the carbon Teflon impregnated fiberglass cover materials, 202 and 204, in combination with the Polyimide foam panel 206 provides a robust lightweight blanket 200 that is operational in the frequency range above 500 Hz.

A further advantage of the blanket 200 is the ease with which the above materials are combined to manufacture the blanket 200. The blanket 200 is fabricated by heat-sealing the top and bottom cover materials, 202 and 204, around their perimeters, with the panel 206 disposed therein to form a fully encapsulated blanket 200. A Fluorinated Ethylene Propylene (FEP) bonding agent may be utilized to heat-seal the perimeter of the cover materials 202 and 204. The FEP bonding agent provides the desirable characteristics of high-heat resistance and high stress crack resistance. In addition, the FEP bonding agent includes a maximum recommended use temperature of nearly four hundred degrees Fahrenheit. Alternatively, however, a variety of other bonding agents may be utilized, so long as they are compatible with the carbon Teflon impregnated fiberglass and able to withstand the environmental conditions present during space travel.

The acoustic blanket 200 may also include a plurality of grommets, as exemplified by grommets 300A–N. During construction of the blanket 200, the A grommets 300A–N are installed in the heat-sealed perimeter of the cover materials, 202 and 204, using a two-piece clamping assembly. As will become apparent from the following description, the grommets 300A–N, are used to mount the blanket 200 on a fairing structure, such as fairing structure 110. In that regard, grommet doublers, 306 and 308, may also be utilized to reinforce the strength of the cover materials, 202 and 204, at the grommet locations. The grommet doublers are preferably, 0.003 inch thick pieces of the carbon Teflon impregnated fiberglass material. Alternatively, however, other materials of varying thickness may be utilized to achieve different reinforcement characteristics, so long as they are compatible with heat-sealing and the environmental conditions present during space flight.

The acoustic blanket 200 may also include at least one vent screen 304 to accommodate pressure changes within the blanket 200 during space flight. The vent screen 304 is heat-sealed into the top cover materiel 202 in a similar manner to the blanket perimeter. The vent screen 304 is multifunctional in that it not only allows for equalization of pressure within the blanket 200, but also prevents particulates from the Polyimide foam core panel 206 from escaping into the fairing assembly 108 and contaminating the payload 106. In that regard, the vent screen 304 is preferably a Teflon or series three hundred stainless steel 325×2300 mesh vent screen. Additional vent screens may also be included in the blanket 200 as a matter of design choice, although a single vent screen, such as vent screen 304, is functional for a blanket such as blanket 200. As will become apparent from the following description, however, other embodiments of the acoustic blanket according to the present invention may require the use of additional vent screens.

With regard to the installation of the vent screen 304, a vent screen doubler 208 provides a second layer that is heat-sealed to the top cover 202 with the edge of the vent screen 304 sandwiched therein. While the vent screen doubler 208 may be any material that is heat-sealable to the top cover 202 and that is suitable for space travel environments, the vent screen doubler 208 is also preferably a 0.003 inch thick piece of the carbon Teflon impregnated fiberglass material.

Advantageously, the combination of the carbon Teflon impregnated fiber-glass cover materials, 202 and 204, the Polyimide foam panel 206, and the method of construction, (primarily heat-sealing), produces an acoustic blanket that is robust and easily manufactured. For instance, an assembled blanket 200 weighs approximately one-quarter pound per square foot while providing acoustic attention in the frequency range above 500 Hz. Those skilled in the art will appreciate the sharp contrast to prior art blankets operational in substantially the same frequency range that can weigh as much as eight to nine pounds per square foot. Further advantages also ensue from the simple construction of the blanket 200, in that it only requires cutting of the panel(s) 206 and cover materials, 202 and 204, followed by heat-sealing to form a fully encapsulated blanket 200. Unlike prior art practices of blanket fabrication, construction of the blanket 200 eliminates the need to tape and/or sew the cover materials together, requires no complicated folding or forming, and minimizes nonrecurring tooling and templates.

Figure 5A:
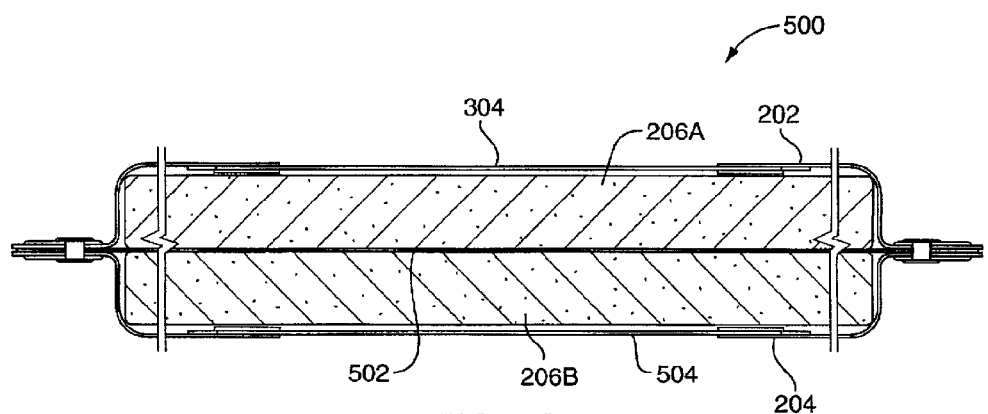
FIG. 5A illustrates a cross sectional view of a second embodiment of an acoustic blanket according to the present invention.
Figure 5B:
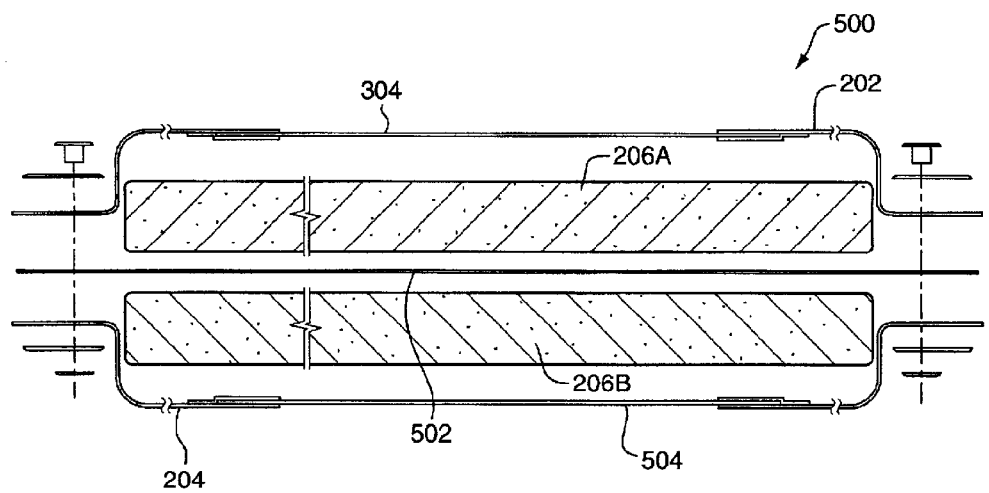
FIG. 5B illustrates a cross sectional assembly view of the acoustic blanket of FIG. 5A.

FIGS. 5A and 5B illustrate another embodiment of an acoustic blanket, namely blanket 500. The blanket 500 is substantially similar to the blanket 200 in that it includes the cover materials, 202 and 204, heat-sealed along their perimeter with the grommets 300A–N. The blanket 500, however, includes the additional feature of two acoustic attenuating panels 206A and 206B. The panels, 206A and 206B, may be identical to the panel 206 in every respect. Alternatively, however, in the case of blanket 500 the panels, 206A and 206B, may preferably have a one and one-half inch thickness to achieve the nominal dimension of eighteen by thirty-six by three inches.

The blanket 500 also includes the additional feature of at least one layer of barrier ply 502 sandwiched between the panels, 206A and 206B. The barrier ply 502 is preferably a septum material that exhibits efficient acoustic attenuating properties in the frequency range below 500 Hz. In one example of the blanket 500, the barrier ply 502 could be at least one layer of fiber reinforced butyl rubber or silicon rubber having a thickness of twenty thousands of an inch. Alternatively, however, the thickness of the barrier ply 502 may be in the range of twenty thousands to one hundred thousands of an inch. Alternatively, multiple layers of the barrier ply 502 could be utilized as a matter of design choice. The fiber reinforced butyl rubber and/or silicon rubber provides the advantage of being inexpensive, and providing acoustic attenuating properties below 500 Hz to enhance blanket performance at lower frequency ranges.

In another example of the blanket 500, the barrier ply 502 could be one or more layers of the carbon Teflon impregnated fiberglass material. In this case, the barrier ply 502 is preferably three layers of the carbon Teflon impregnated fiberglass material having a thickness of about five thousands of an inch. Those skilled in the art will appreciate other barrier ply materials that may be incorporated into the blanket 500 as a matter of design choice.

The construction of the blanket 500 is similar to that of the blanket 200. However, as shown on FIG. 5B, the barrier ply 502 is not only sandwiched between panels 206A and 206B, but is also heat-sealed between the cover materials, 202 and 204, around the perimeter, using the FEP bonding agent. Alternatively, however, the barrier ply 502 could be mechanically attached, such as by sewing between the cover materials, 202 and 204. Similarly, the barrier ply 502 may be bonded to the surface of a respective one of panels 206A and 206B. It will be appreciated that the method of attachment is of less importance than the fact that the barrier ply 502 is attached, as the attachment between the cover materials, 202 and 204, prevents the transmission of un-dampened acoustic energy around the edges of the blanket 500. Additionally, attachment of the barrier ply 502 between the cover materials, 202 and 204, also prevents slumping of the barrier ply 502 within the blanket 500.

The blanket 500 may also include the vent screen 304 to accommodate pressure changes during flight. In the case of the blanket 500, however, it is also preferable to include a second vent screen 504 heat-sealed into the bottom cover materiel 204 in a similar manner. The vent screen 504 permits pressure equalization on both sides of the barrier ply 502, as the barrier ply 502 does not permit significant airflow between the top portion of the blanket 500, containing panel 206A, and the bottom portion of the blanket 500, containing panel 206B. As with the vent screen 304, the vent screen 504 is multifunctional in that it not only allows for equalization of pressure within the bottom portion of blanket 500, but also prevents particulates from the panel 206B from escaping into the fairing assembly 108 and contaminating the payload 106. In that regard, the vent screen 504 is also preferably Teflon or series three hundred stainless steel 325×2300 mesh vent screen. Additional vent screens may also be included in the blanket 500 as a matter of design.

Advantageously, the combination of the carbon Teflon impregnated fiberglass covers, 202 and 204, Polyimide foam panels, 206A and 206B, and barrier ply 502 provides another embodiment of the acoustic blanket that is robust and easily manufactured. For instance, an assembled blanket 500 weighs approximately one-half pounds per square foot while providing acoustic attention in the frequency range above and below 500 Hz. In addition, as with the blanket 200, construction of the blanket 500 eliminates the need to tape and/or sew the cover materials together, requires no complicated folding or forming, and minimizes nonrecurring tooling and templates.

Figure 6A:
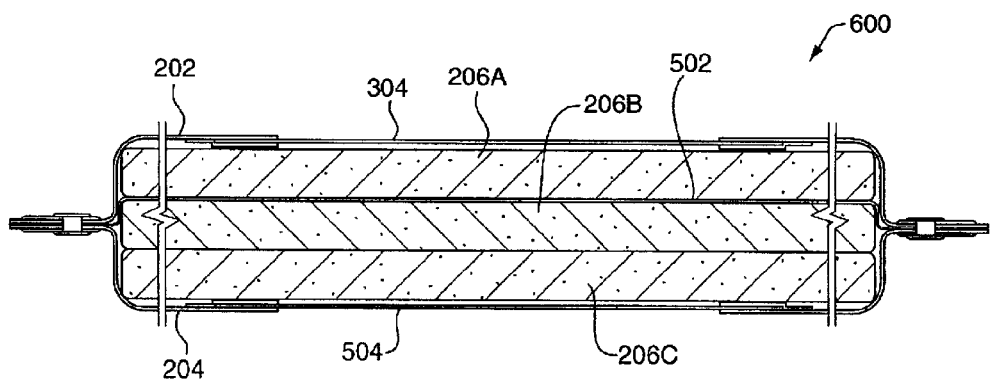
FIG. 6A illustrates a cross sectional view of a third embodiment of an acoustic blanket according to the present invention.
Figure 6B:
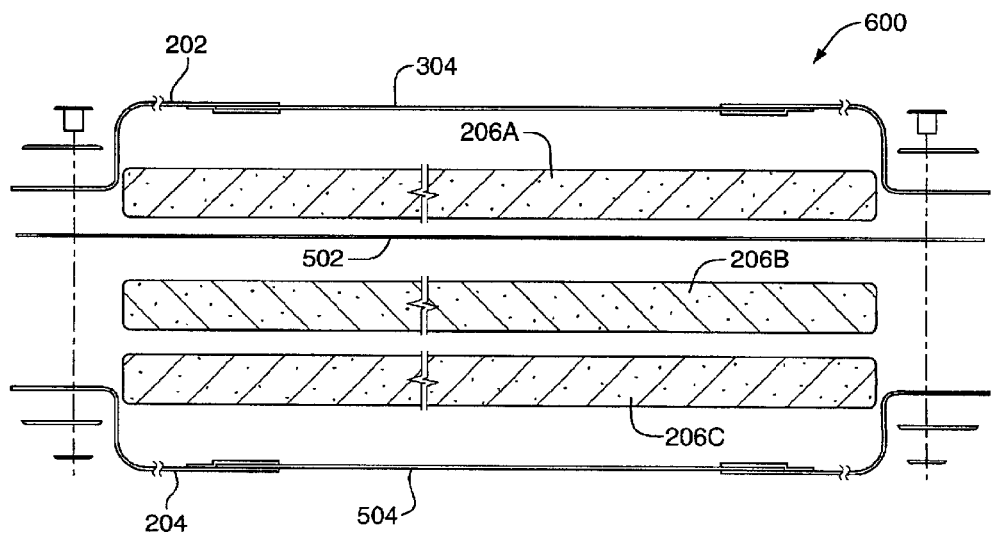
FIG. 6B illustrates a cross sectional assembly view of the acoustic blanket of FIG. 6A.

FIGS. 6A and 6B illustrate another embodiment of an acoustic blanket, namely blanket 600. The blanket 600 is substantially similar to the blankets, 200 and 500, in that it includes the cover materials, 202 and 204, heat-sealed along their perimeters with the grommets 300A–N. The blanket 600, however, includes the additional feature of having three acoustic attenuating panels 206A–206C. The panels 206A–206C may be identical to the panel 206 in every respect. Alternatively, however, in the case of blanket 600 the panels 206A–206C may preferably have a one-inch thickness to achieve the nominal dimensions of eighteen by thirty-six by three inches.

The blanket 600 also includes the layer of barrier ply 502. Advantageously, the inclusion of multiple panels, such as the three panels 206A–206C, in combination with the barrier ply 502, provides a variety of tuning opportunities with respect to the acoustic attenuation characteristics of the blanket 600. As discussed above, an even higher blanket performance can be achieved in many applications by leaving an air gap between the surface of a fairing structure 110 and the acoustic blanket mounted thereon. In the case of blankets, 500 and 600, however, the barrier ply 502 effectively defines a second air gap as indicated by numeral 708 on FIG. 7. Since the barrier ply 502 permits virtually no acoustic transmission between portions of the blankets 500 and 600 that are separated by the barrier ply 502, the second air gap 708 is formed between the barrier ply 502 and the skin of the fairing structure 110. By providing multiple panels 206A–206C, the second air gap 708 is easily increased and/or decreased by the location of the barrier ply 502 within the blanket 600, and specifically within the panels 206A–206C. For instance, in one example of the blanket 600, the barrier ply 502 may be located between the panels 206A and 206B to define an air gap 708 of a first dimension, e.g. three inches, to achieve a first set of acoustic attenuation characteristics. In another example of the blanket 600, the barrier ply 502 may be located between the panels 206B and 206C to define an air gap 708 of a second dimension, e.g. two inches, to achieve a second set of acoustic attenuation characteristics. Furthermore, additional tuning may be performed to achieve other acoustic attenuation characteristics for the blanket 600 by varying the thickness of the panels 206A–206C as well as the position of the barrier ply 502 within the blanket 600.

It should be noted, however, that as with the blanket 500, it is preferable to include multiple vents screen, such as vent screen 304, heat-sealed in the top cover to material 202 and vent screen 504, heat-sealed in the bottom cover material 204 to accommodate pressure changes in the top and bottom portions of the: blanket 600 separated by the barrier ply 502.

The construction of the blanket 600 is similar to that of the blankets 200 and 500. However, as can be seen on FIG. 5A the barrier ply 502 may not always align with the heat-sealed joint around the perimeter of the cover materials 202 and 204. In this case, it is necessary to include a sufficient amount of the barrier ply material so that it may be heat-sealed between the cover materials, 202 and 204, as described in connection with the blanket 500. Alternatively, however, the barrier ply 502 could be mechanically attached, such as by sewing between the cover materials, 202 and 204. Similarly, the barrier ply 502 may be bonded to the surface of the respective one of panels 206A–206C. As with the above example, it will be appreciated that the method of attachment is of less importance than the fact that the barrier ply 502 is attached, as the attachment between the cover materials, 202 and 204, prevents the transmission of un-dampened acoustic energy around the edges of the blanket 600. Furthermore, as noted above, the attachment to the cover materials, 202 and 204, provides the advantage of preventing slumping of the barrier ply 502 within the blanket 600 during maximum loading conditions.

The Mounting System

Figure 7:
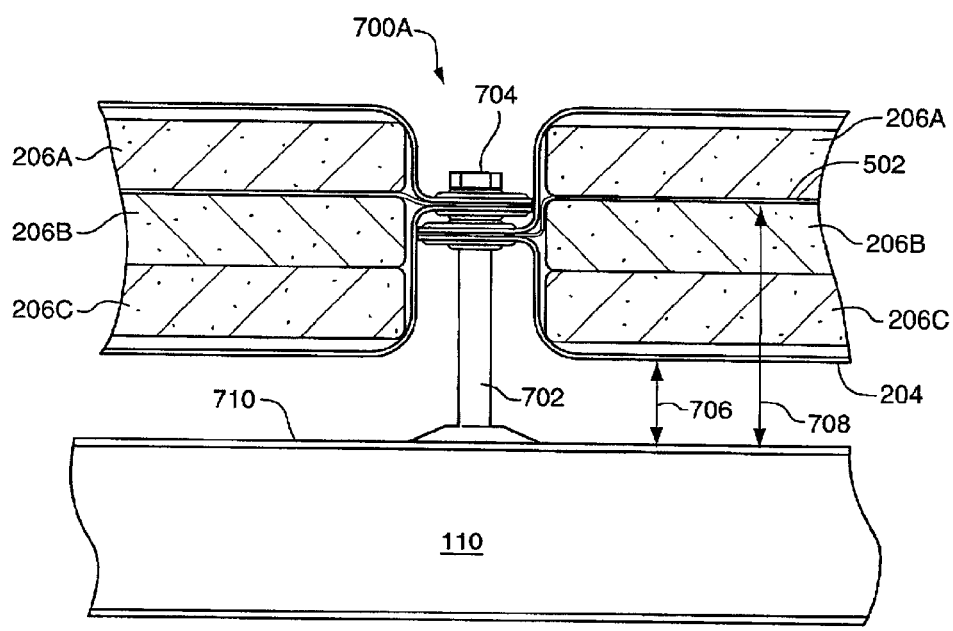
FIG. 7 illustrates an example of the mounting assembly according to the present invention.
Figure 8:
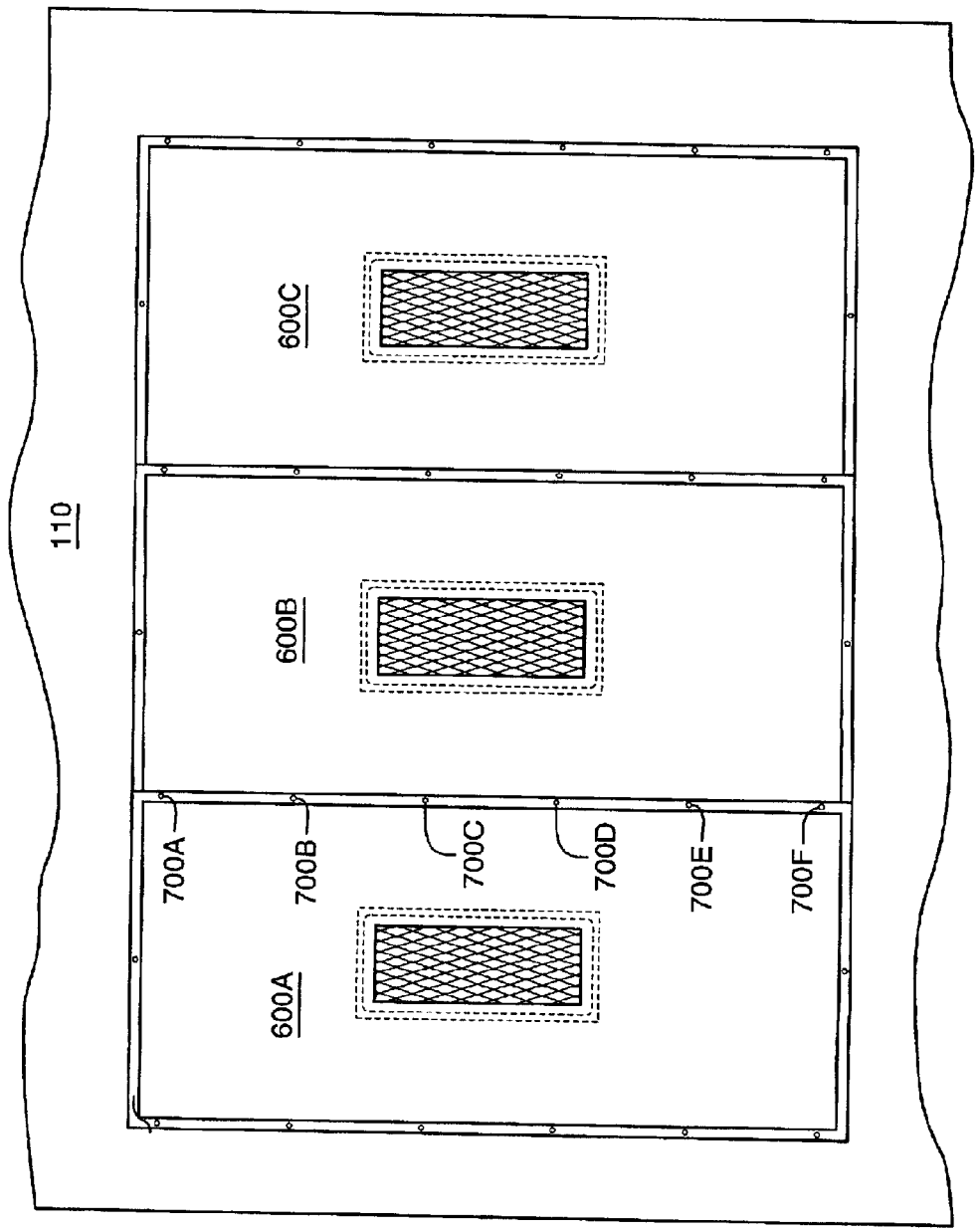
FIG. 8 illustrates a plan view of the present acoustic blanket system installed on a payload fairing of the space vehicle of FIG. 1.

FIGS. 7 and 8 illustrate a mounting system according to the present invention. For purpose of illustration, the following description of the mounting system is discussed in the context of mounting multiple blankets 600A–C on the fairing structure 110 of the space vehicle 100. It will be appreciated, however, that the discussion applies equally to other embodiments of the acoustic blanket according to the present invention.

The present mounting system includes a plurality of fastener assemblies, as exemplified by fastener assembly 700A. The fastener assembly 700A includes an internally threaded standoff 702 and mating threaded member 704, e.g. a bolt. The individual standoffs, e.g. standoff 702, are bonded to the surface 710 of the fairing structure 110 and are collocated with the grommets 300A–N so that the bolts, e.g. bolt 704, pass through the grommets to secure the blanket to the standoffs, e.g. 702. In the case of adjacent blankets, such as blankets 600A and 600B, a single standoff and threaded member is utilized to secure the two overlapping grommets to form a substantially sealed seam between the adjacent blanket 600A and 600B.

As shown on FIG. 8, an individual fastener assembly is used at each of the individual grommet locations 300A–N, as exemplified by fastener assemblies 700A–F. It will be appreciated, however, that grommets 300A–N are illustrative of an approximate number of grommets and respective number of fastener assemblies that could be used to secure the blankets 600A–C to the fairing structure 110. Alternatively, additional or fewer grommets and fastener assemblies could be utilized as a matter of design choice.

As can be seen on FIG. 7, using standoffs of different heights, the air gap 706 between the surface of the fairing structure 110 and the bottom cover material 204 is easily adjusted to achieve different acoustic attenuating characteristics. In addition, using the multiple fastener assemblies, e.g. assembly 700A, around the perimeter of the blankets 600A–C, the air gap 706 remains substantially uniform. This provides a significant advantage with respect to tuning and maintaining the tuned acoustic attenuation characteristics of the blankets 600A–C during flight, by preventing deforming or slumping of the blankets 600A–C relative to the fairing structure 110. Additionally, in blankets, such as blankets 500 and 600 that include the barrier ply 502, still additional acoustic attenuation characteristics can be achieved by using the combination of the height of the standoffs, the thickness of the panels 206A–206C, and the location of the barrier ply 502 within the panels 206A–206C. A still further advantage of the present, mounting system realized through the ability to accurately control the air gaps, 706 and 708, is improved efficiency of the blanket 600. This in turn permits the use of lower density materials to achieve the desired acoustic attenuation, which is in contrast to the prior art approach of adding material to blankets to achieve desired acoustic attenuation.

Alternatively, the fastener assemblies, such as assembly 700A, could be easily modified to provide additional advantages. For example, a jam nut and locking nut could be included on the threaded member 704 to permit further tuning of the air gaps 706 and 708. In this case, small adjustments could be made to each of the threaded members before the threaded members are locked via the locking nut into position on the standoffs, e.g. standoff 702.

Advantageously, the mounting system including the fastener assemblies is simple and requires a minimum of tools and expertise. Yet another advantage of the present fastening system is that the blankets 600A–C are definitively secured to the fairing structure 110, without the use of complex frames, bonding agents or lacing tape. This in turn provides better dimensional control of the air gaps, 706 and 708, and prevents slumping of the blankets 600A–C resulting in an increased efficiency.

Those skilled in the art will appreciate variations of the above-described embodiments that fall within the scope of the invention. As a result, the Invention is not limited to the specific examples and illustrations discussed above, but only by the following claims and their equivalents.

We claim:

1. An acoustic blanket, comprising:
   a first polytetrafluoroethylene impregnated fiberglass cover material;
   a second polytetrafluoroethylene impregnated fiberglass cover material heat-sealed to the first cover material around at least a portion of a perimeter of the first and second cover materials; and
   at least one Polyimide foam panel disposed between the heat-sealed first and second cover materials.

2. The blanket of claim 1 comprising:
   a plurality of fastener assemblies to connect the acoustic blanket to a structure so as to define an air gap of pre-determined dimension between the acoustic blanket and the structure, wherein the pre-determined dimension of the air gap is controllable by the fastener assemblies.

3. The blanket of claim 1 comprising:
   at least one vent disposed in at least one of the first and second cover materials.

4. The blanket of claim 3 wherein the at least one vent comprises:
   one of a stainless steel vent screen and a Teflon vent screen heat-sealed into the at least one of the first and second cover materials.

5. The blanket of claim 1 comprising:
   a plurality of Polyimide foam panels disposed between the heat-sealed first and second cover materials.

6. The blanket of claim 1 comprising:
   at least one barrier ply layer disposed between the heat-sealed first and second cover materials.

7. The blanket of claim 6 wherein the at least one barrier ply layer comprises:
   one of a butyl rubber layer and a silicon rubber layer.

8. The blanket of claim 6 wherein the at least one barrier ply layer comprises:
   a polytetrafluoroethylene impregnated fiberglass layer.

9. The blanket of claim 2 comprising:
   a plurality of grommets disposed in the heat-sealed perimeter of the first and second cover materials.

10. The blanket of claim 9 wherein the plurality of fastener assemblies comprise:
    a plurality of standoffs mounted on the structure and collocated with the plurality of grommets; and
    a plurality of members threadable into the plurality of standoffs to secure the acoustic blanket to the standoffs and position the blanket above the structure so as to define the pre-determined air gap between the acoustic blanket and the structure.

11. The system of claim 1 wherein the acoustic blanket weight is in the range of one-quarter pound per square foot and one pound per square foot.

12. An acoustic blanket system, comprising:
    a first cover material;
    a second cover material connected to the first cover material;
    at least one acoustic attenuating panel disposed between the first and second cover materials; and
    a plurality of fastener assemblies to connect the acoustic blanket to a structure to define an air gap of pre-determined dimension between at least portions of the perimeter of the acoustic blanket and the structure, wherein the fastener assemblies control the pre-determined dimension of the air gap and the portions of the perimeter are defined by fastener locations adjacent an outer edge of the acoustic blanket to provide a separation between at least portions of an outer edge of the acoustic blanket and the structure free from any connecting support structure therebetween.

13. The blanket of claim 12 comprising:
    at least one vent screen disposed in at least one of the first and second cover materials.

14. The blanket of claim 13 wherein the at least one vent comprises:
    one of a stainless steel vent screen and a polytetrafluoroethylene vent screen heat-sealed in the at least one of the first and second cover materials.

15. The blanket of claim 12 wherein the at least one acoustic attenuating panel comprises:
    a Polyimide foam panel.

16. The blanket of claim 12 comprising:
    a plurality of acoustic attenuating panels disposed between the first and second cover materials.

17. The blanket of claim 16 comprising:
    at least one barrier ply layer disposed between the first and second cover materials.

18. The blanket of claim 12, wherein the first and second cover materials comprise:
    polytetrafluoroethylene impregnated fiberglass, and wherein the first and second cover materials are heat-sealed around at least a portion of a perimeter of the first and second cover materials and include a plurality of grommets disposed within the heat-sealed perimeter.

19. The blanket of claim 18 wherein the plurality of fastener assemblies comprise:

a plurality of standoffs mounted on the structure and collocated with the plurality of grommets; and a plurality of members threadable into the plurality of standoffs to secure the acoustic blanket to the standoffs so as to define the predetermined air gap between the acoustic blanket and the structure.

20. An acoustic blanket system for space vehicles, comprising:

a structure defining at least a portion of a space vehicle;

at least one acoustic blanket connected to the structure comprising:

a first polytetrafluoroethylene impregnated fiberglass cover material;

a second polytetrafluoroethylene impregnated fiberglass cover material heat-sealed to the first cover material around at least a portion of the perimeter of the first and second cover material;

at least one Polyimide foam panel disposed between the heat-sealed first and second cover materials; and a plurality of fastener assemblies to connect the acoustic blanket to the structure.

21. The system of claim 20 wherein the plurality of fastener assemblies connect the acoustic blanket to the structure to define an air gap of pre-determined dimension between the acoustic blanket and the structure, wherein the fastener assemblies control the pre-determined dimension of the air gap.

22. The system of claim 20 comprising:

at least one vent screen disposed in at least one of the first and second cover materials.

23. The blanket of claim 22 wherein the at least one vent comprises:

one of a stainless steel vent screen and a polytetrafluoroethylene vent screen heat-sealed in the at least one of the first and second cover materials.

24. The blanket of claim 20 comprising:

a plurality of Polyimide panels disposed between the heat-sealed first and second cover materials.

25. The blanket of claim 20 comprising:

at least one barrier ply layer comprising:

one of a butyl rubber layer, a polytetrafluoroethylene impregnated fiberglass layer and a silicon rubber layer.

26. The blanket of claim 20 comprising:

a plurality of grommets disposed in the heat-sealed perimeter of the first and second cover materials.

27. The blanket of claim 26 wherein the plurality of fastener assemblies comprise:

a plurality of standoffs mounted on the structure and collocated with the plurality of grommets; and a plurality of members matable with the plurality of grommets and threadable into the plurality of standoffs to secure the acoustic blanket to the standoffs so as to define the predetermined air gap between the acoustic blanket and the structure.

28. A method for constructing an acoustic blanket, the method comprising:

providing first and second cover materials comprising polytetrafluoroethylene impregnated fiberglass;

providing a Polyimide foam panel of a pre-determined dimension; and heat-sealing a perimeter of the first and second cover materials with the Polyirmide foam panel disposed within a cavity defined by the heat-sealed first and second cover material.

29. The method of claim 28 wherein the step of heat-sealing comprises:

disposing a plurality of grommets within the perimeter of the first and second cover materials.

30. The method of claim 28 comprising:

providing at least one vent; and heat-sealing the at least one vent into one of the first and second cover material.

31. The method of claim 28 comprising:

providing a plurality of Polyimide foam panels; and heat-sealing the perimeter of the first and second cover materials with the plurality of the Polyimide panels disposed within the cavity.

32. The method of claim 31 comprising:

providing at least one barrier ply layer; and heat-sealing a perimeter of the at least barrier ply layer into the perimeter of the first and second cover materials.

33. A method of mounting an acoustic blanket to a structure, the method comprising:

providing a plurality of separate standoffs;

using the plurality of standoffs to define a controllable air gap between at least portions of the perimeter of the acoustic blanket without any connecting support structure between individual ones of the plurality of standoffs, wherein the using step includes the steps of:

connecting the plurality of standoffs to the structure so that individual ones of the plurality of standoffs are collocated with individual ones of a plurality of apertures defined in the acoustic blanket at substantially the perimeter of the acoustic blanket; and connecting individual fasteners to the individual standoffs to secure the acoustic blanket to the individual standoffs to define the air gap between at least portions of the perimeter of the acoustic blanket and the structure free from any connecting support structure between the individual standoffs.

34. A method of tuning an acoustic blanket, the method comprising:

providing first and second cover materials;

providing at least two sound attenuating panel;

heat-sealing a perimeter of the first and second cover materials, with the at least two sound attenuating panels disposed within a cavity defined by the heat-sealed first and second cover materials;

selecting between a first and second location of a barrier ply layer, locating the barrier ply layer in the first location to achieve a first acoustic attenuation characteristic and locating the barrier ply layer in the second location to achieve a second acoustic attenuation characteristic different from the first; and connecting the acoustic blanket to a structure using a plurality of standoffs to secure the acoustic blanket to the structure so as to define an air gap between at least a perimeter of the acoustic blanket and the structure.

\* \* \* \* \*